FREQUENCY RESPONSIVE RECEIVING SYSTEM WITH NOISE PREVENTION

Filed Dec. 31, 1962 2 Sheets-Sheet 1

JOEL H. AXE
INVENTOR.
BY Allen M. Sutton
ATTORNEY

FREQUENCY RESPONSIVE RECEIVING SYSTEM WITH NOISE PREVENTION

Filed Dec. 31, 1962

2 Sheets-Sheet 2

JOEL H. AXE
INVENTOR.

BY Allen M. Sutton

ATTORNEY

United States Patent Office 3,341,815
Patented Sept. 12, 1967

3,341,815

FREQUENCY RESPONSIVE RECEIVING SYSTEM WITH NOISE PREVENTION

Joel H. Axe, Pacoima, Calif., assignor, by mesne assignments, to The Bunker-Ramo Corporation, Stamford, Conn., a corporation of Delaware Filed Dec. 31, 1962, Ser. No. 248,384
12 Claims. (Cl. 340—171)

This invention relates to systems for receiving a plurality of conditional electrical signals having different predetermined frequency characteristics. Furthermore, the invention relates to an improved receiving system embodying a novel circuit for discriminating between the plurality of signals and which is virtually completely insensitive to electrical noise signals that might be mistaken for legitimate signals in systems heretofore known.

There are many instances involving remote control operations where radio receiving systems are utilized to receive and cause a response to various commands which are represented by the presence or absence of signals having various predetermined frequencies. For example, in the area of space technology, missiles and satellites may receive such signals from a control station to cause them to alter their courses, transmit various kinds of data back to the control station, or even to destroy themselves. A difficulty with such systems heretofore known is that electrical noise signals may be received and mistaken by the system for command signals. Thus, it is extremely desirable to provide a command receiving system which is insensitive to noise signals. The present invention finds particular utility in command receiving systems. Hence, it will be described in that application, although it is understood that the invention may be applied to many other uses.

It is well known in the communications art that discriminators used to demodulate frequency modulated (F.M.) electrical signals have excellent noise rejection qualities, as compared to an amplitude modulation detector. Therefore, F.M. techniques have been generally used in command receiving systems. The characteristics of a discriminator are such that, when a signal is received that has a frequency corresponding to that to which the discriminator is tuned, the output from the discriminator is zero. However, as the frequency of the received signal deviates from that to which the discriminator is tuned, the discriminator provides positive and negative direct voltage output signals, whose amplitudes are indicative of the amount of frequency deviation of the received signal and whose polarities depend upon the direction of the frequency deviation. In a receiving system, the discriminator is generally preceded by an amplitude-limiting amplifier, so that all signals presented to the discriminator have equal amplitudes. Thus, noise signals, which are generally distributed across the frequency spectrum, provide output signals from the discriminator, the direct current components of which are of equal amplitudes and substantially cancel each other. However, because of the phase shift characteristics of the tuned circuits of the discriminator, the alternating current components of the noise signals do not cancel each other and are present in the discriminator output.

It is known that discriminators exhibit characteristics of suppressing weak signals and favoring the stronger of two simultaneous signals. This effect is favorable when the signal-to-noise ratio in the discriminator input is relatively large, because it acts to further reduce the noise. However, if the signal-to-noise ratio is reduced, a point is reached where the signal itself is suppressed and only noise is present in the discriminator output. Thus, the system is susceptible to jamming.

A typical command receiving system heretofore known comprises a radio frequency (R.F.) section for receiving, amplifying and demodulating a carrier, which may be frequency modulated or amplitude modulated by one or more of a plurality of tone frequencies. The output of the R.F. section is fed to a plurality of signal channels, with each channel including a filter tuned to pass a different one of the tone frequency signals (command signals). An output control signal from each channel, produced in response to a tone frequency signal, is utilized to operate a relay or other control device. Obviously, if noise signals of adequate amplitude are present in the output of the R.F. section, they may pass through the tuned filters and operate the control devices. A further disadvantage of such a system is that, in general, signals of only one polarity are provided from each of the channels and hence only a limited number of control functions may be performed by a given number of command signals.

The present invention provides a receiving system having greatly improved noise rejection characteristics as well as the capability of discriminating between signals that are relatively closely spaced in the frequency spectrum. Furthermore, the system provides a greatly increased number of output control signal combinations in a given portion of the frequency spectrum over that which has heretofore been possible. The system may be adapted to receive signals having different radio frequency carrier frequencies which are unmodulated, or it may be adapted to receive signals all of which have the same carrier frequency but which have different modulation frequencies (tone frequencies). The advantages of the invention are obtained in both embodiments.

The vastly improved noise rejection characteristics of the present multi-channel system are based on the concept of positively and negatively rectifying amplitude-limited noise signals. The channels are interconnected whereby the positive signal from each channel is combined with the negative signal from another channel to provide virtually complete noise cancellation. Each channel operates as one-half of two different pairs of channels to provide a great number of positive and negative control signal combinations.

Broadly speaking, the invention provides a system for receiving and responding to electrical signals having different predetermined frequency characteristics. The system comprises input means for receiving the signals, amplifying them, and limiting their amplitudes. The amplitude-limited signals are then supplied to a plurality of channels, each of which is responsive to a different one of the amplitude-limited signals. Each channel includes rectifier means, which provides both positive and negative direct current output signals in response to signals having the frequency characteristic to which the channel is responsive. Output means are provided for each of the rectifier means and signals of one polarity are provided from each rectifier means to its corresponding output means, with all of the rectifier means providing signals of the same polarity to their corresponding output means. The output signals of the other polarity from each rectifier means are supplied to the output means of another rectifier means. Thus, each output means receives positive output signals from one rectifier means and negative output signals from another rectifier means. Actuatable means are connected to each output means to respond to the signals present thereon.

The number of channels utilized depends on the number of different frequencies on which signals are to be received. Regardless of the number of channels employed, however, the channels operate in pairs, so that each of the output means receives a positive output signal from one rectifier means and a negative output signal from another rectifier means. Thus, when noise signals are present and are distributed across the frequency spectrum, as is almost invariably the case, at each output means the positive signal produced by one rectifier means in response to a noise signal is cancelled by the negative signal produced by another rectifier means in response to a noise signal. Thus, this feature provides a system which has an extremely high rejection capability against ordinary electrical noise.

Each of the channels may be made highly frequency selective by utilizing appropriate filter means in the rectifier means to pass incoming signals. The filter means may comprise magnetostrictive filters, crystal filters or other filters, as desired, to permit close spacing of the various signal frequencies. Alternatively, they may be bandpass filters chosen to cover a portion of the frequency spectrum substantially without interruption.

If the actuatable means of each channel are of a type that responds differently to positive and negative signals, a variety of combinations may be provided for control purposes. For example, a system comprising four channels can provide up to fourteen different combinations of positive and negative output signals to the actuatable means in response to various combinations of received signals.

Further features and advantages of the invention will become apparent from the following description of two embodiments, taken in conjunction with the accompanying drawings, in which.

Figure 1:
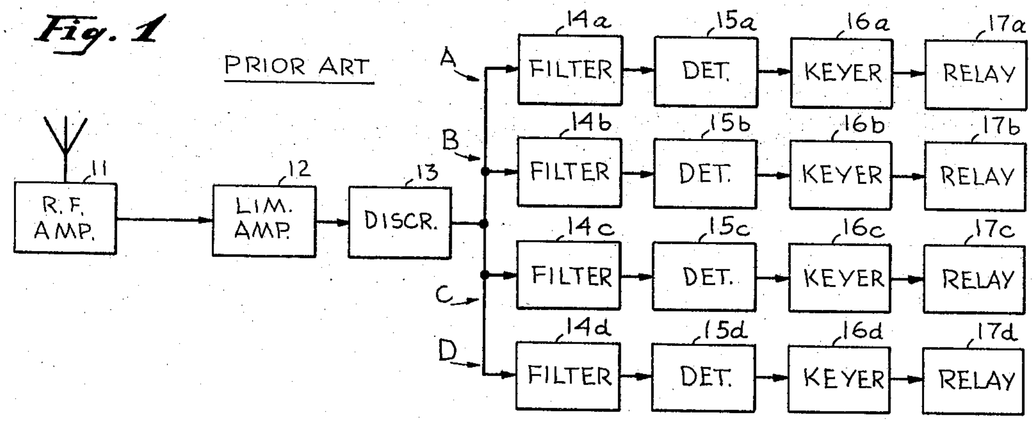
FIGURE 1 is a block diagram of a known system for receiving a frequency modulated radio signal in which the carrier frequency is modulated by one or more of four command signal tones.

The block diagram of FIG. 1 illustrates a typical command receiving system of a known type for receiving a carrier that is frequency modulated by one or more of four different tone frequencies (command signals). The system comprises an R.F. amplifier 11 for receiving and amplifying the incoming signals. The R.F. signals are then passed to a limiter-amplifier 12, where their amplitudes are limited and thence to a conventional discriminator 13. The discriminator 13 removes the carrier so that its output contains whatever tone frequencies have modulated the carrier, plus any noise signals that have come through the discriminator.

The output of the discriminator 13 is provided to four so-called decoding channels, designated as A,B, C and D. Hereafter, suffixes *a*, *b*, *c* and *d* will be appended to reference numerals to indicate corresponding parts in the four channels.

Each channel A, B, C, D, includes a tuned input filter 14, a detector 15, a keyer 16, and an output control device such as a relay 17. Each input filter 14 is tuned to a different one of the command signal tone frequencies. If a command or other signal is received, which has a frequency to which a filter 14 is tuned, it is passed by the filter and rectified by the corresponding detector 15. The direct current output signal from the detector 15 may actuate the keyer 16, such as a Schmitt trigger circuit, which in turn may actuate the relay 17.

It is apparent that in the system shown in FIG. 1 any noise signals present in the output of the discriminator 13, which are passed by the filters 14 and are of sufficient amplitude to actuate the keyers 16, will cause the relays 17 to be actuated and produce a spurious control action. Of course, this is extremely undesirable. It is also pointed out that signals of only one polarity are generally utilized in each of the decoding channels. Therefore, a more limited number of functions can be controlled by a given number of command signals than would be the case where there is interaction between the channels to provide combinations of both positive and negative control signals.

Figure 2:
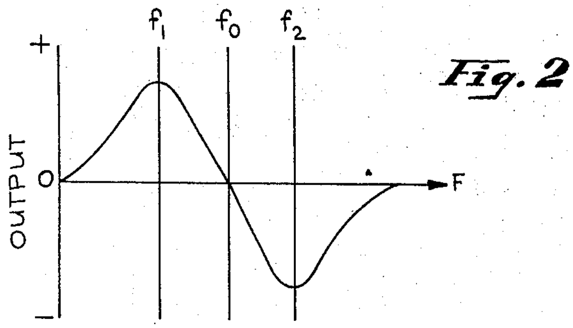
FIG. 2 shows a typical characteristic curve of a discriminator, such as is utilized in the system shown in FIG. 1.

The method of operation of a typical discriminator and the reason for its electrical noise rejection characteristics may be readily understood from the characteristic curve shown in FIG. 2, which illustrates the output of a discriminator in response to input signals having various frequencies. As there shown, an input signal having a certain frequency $f_0$ to which the discriminator is tuned produces zero output from the discriminator. However, an input signal having a frequency $f_1$ produces a maximum positive direct current output signal and an input signal having a frequency $f_2$ produces a maximum negative direct current output signal. If electrical noise signals are present at the input to the discriminator, which signals are generally evenly distributed across the frequency spectrum, output signals will be produced in response to the noise input signals, the direct current positive and negative components of which are of equal amplitudes and will substantially cancel each other. However, the alternating current components will not cancel out and will be present in the discriminator output. This occurs because the discriminator embodies two tuned circuits, one tuned to the frequency $f_1$ and the other tuned to frequency $f_2$. Therefore, the alternating current components of noise signals passed by the two tuned circuits will be of different frequencies and hence out of phase so that they will not cancel each other.

Figure 3:
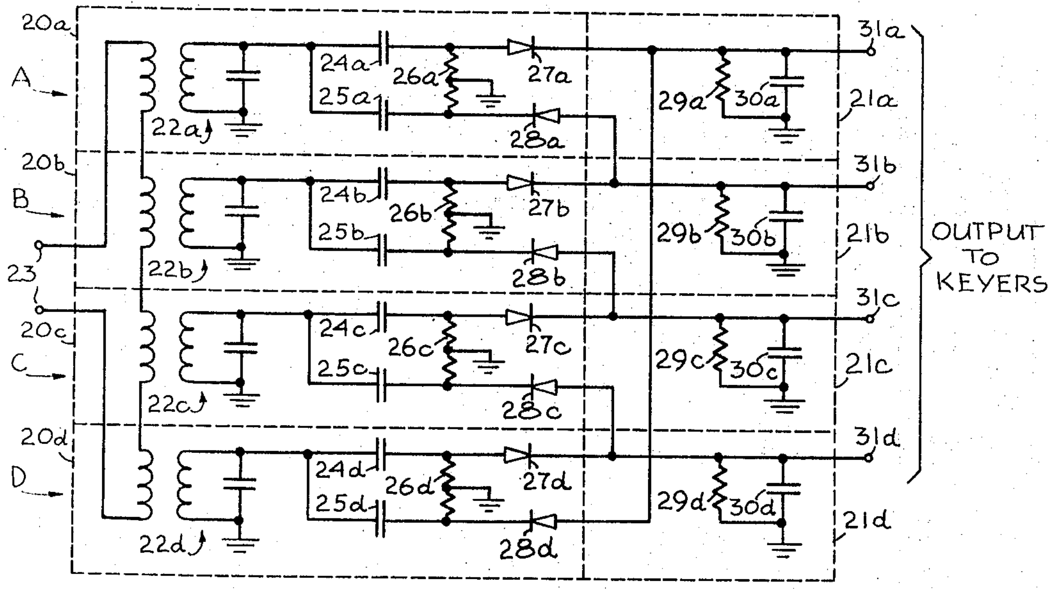
FIG. 3 is a circuit diagram of a portion of an embodiment of the present invention.

One feature of the present invention is the provision of a novel circuit for discriminating between a plurality of conditional input signals having different frequency characteristics. The circuit, which is shown in FIG. 3 may be utilized to replace the filters 14 and detectors 15 in the four-channel system shown in FIG. 1, for example, to provide the features and advantages previously noted. Although four channels, A, B, C and D, are shown in FIG. 3, it is again understood that a greater or lesser number of channels may be employed, depending upon the number of different command signals to be received, Again, as in FIG. 1, the suffixes *a*, *b*, *c*, *d*, are utilized to denote corresponding elements in the four channels, A, B, C, D.

As seen in the figure, each of the channels A, B, C and D includes rectifier means, indicated generally by numeral 20, and output means, indicated generally by numeral 21. Each rectifier means 20 includes input filter means, designated generally by the numeral 22, with the filter means being connected in series between input terminals 23. The filters may also be connected in parallel, if desired. The input terminals 23 are supplied with amplitude-limited signals from a prior stage in a system. The invention contemplates that the input filter means 22 may be of various types. For example, if it is desired to have definite frequency gaps existing between the responses of adjacent channels, the filter means may be sharply tuned magnetostrictive filters or crystal filters. On the other hand, if it is desired to have the system cover a portion of frequency spectrum substantially without interruption, the input filter means may be bandpass filters. Also, if the circuit is being used in a tone modulation system, such as shown in FIG. 1, the input filter means would, in all probability, be conventional audio filters. Suffice it to say that the input filter means 22 may be conventional filters of various types for passing a desired frequency or frequency band of signals.

The output of each input filter means is supplied to a rectifier circuit for providing both positive and negative direct current output signals in response to signals passed by the input filter in the channel. The output of each input filter means 22 is connected to one side of each of two direct current blocking capacitors 24 and 25, and the other sides of the two capacitors in each channel are connected to opposite ends of a resistor 26 having a grounded center tap. The opposite ends of the resistors 26 are also connected to diode rectifiers 27 and 28, with the polarities of the diodes 27 being such that they will pass positive signals and the polarities of the diodes 28 being such that they will pass negative signals. The other side of each diode 27 is connected to the output means 21 comprising a load resistor 29, a low-pass output filter represented by a shunt capacitor 30, and an output terminal 31. Positive direct current output signals appear across the output filter 30 of each channel in response to input signals being passed by the filter means 22 of that channel.

The thus far unconnected side of each diode 28 is connected to the output filter 30 of an adjacent channel to provide to that output filter negative direct current output signals of substantially the same amplitude as the positive signals provided by the diodes 27. Specifically, the diode 28*a* is connected to the output filter 30*b*, the diode 28*b* is connected to the output filter 30*c*, the diode 28*c* is connected to the output filter 30*d* and the diode 28*d* is connected to the output filter 30*a*. Thus, the various channels are connected to operate in pairs such that each output filter 30 receives positive signals from one channel and negative signals from another channel with the positive and negative signals having substantially equal amplitudes. In this manner, noise signals which are distributed across the frequency spectrum are substantially cancelled out at each output filter and do not appear at the output terminals 31.

Figure 4:
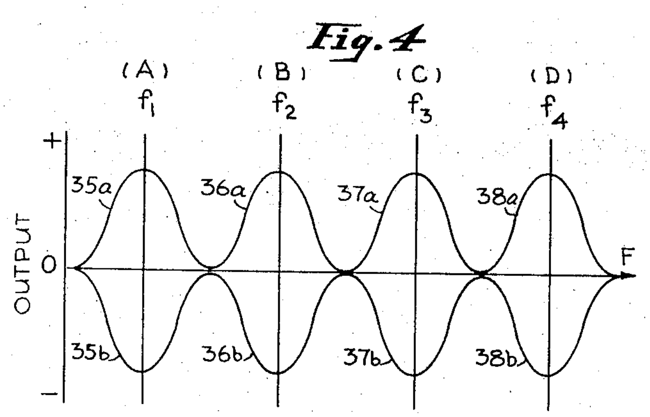
FIG. 4 shows a set of characteristic curves of a frequency-sensitive portion of the system of the present invention.

In the circuit of FIG. 3, the four rectifier means 20 may have characteristics as shown by idealized curves 35*a* and 35*b*, 36*a* and 36*b*, 37*a* and 37*b*, and 38*a* and 38*b*, respectively, in FIG. 4. If an incoming command signal has a frequency $f_1$, it will cause both positive and negative direct current output signals to be provided from channel A, as shown by the curves 35*a* and 35*b*. Similarly, input signals having frequencies $f_2$, $f_3$ and $f_4$ will cause both positive and negative direct current output signals to be produced from channels B, C and D, as shown by the curves 36*a* and 36*b*, 37*a* and 37*b*, and 38*a* and 38*b*, respectively. The positive output signals from each channel are combined with the negative output signals from another channel. Specifically, signals produced according to the curves 35*a* and 38*b* are combined to provide an output from channel A, according to curves 36*a* and 35*b* to provide an output from channel B, according to curves 37*a* and 36*b* to provide an output from channel C, and according to curves 38*a* and 37*b* to provide an output from channel D. Thus, if electrical noise input signals are present across the frequency spectrum covered by the system, equal positive and negative output signals will be provided from each channel which will substantially cancel each other at each output means.

Let us now consider the operation of the circuit in response to various command signals, assuming that the frequencies of the command signals are sufficiently spaced apart so that there is no overlap in the response characteristics of the input filter means 40. Under this condition, the composite response characteristics of the circuit would be substantially as shown by FIG. 4. If a command signal having a frequency to which channel A responds now appears, it is rectified and a positive direct current output signal appears at terminal 31*a*. A negative direct current output signal also appears at terminal 31*b*, but there are no output signals present at terminals 31*c* and 31*d*. If a command signal is received which has a frequency to which channel B is responsive, a positive output signal appears at terminal 31*b* and a negative output signal at terminal 31*c*. The positive signal appearing at terminal 31*b* is blocked from appearing in channel A because of the capacitors 24*a* and 25*a*. Thus, there is no output signal present at terminal 31*a* or at terminal 31*d*.

Assume now that command signals are received simultaneously by both channels A and B. In this case, a positive output signal appears at terminal 31*a*. However, output filter 30*b* receives both a negative output signal from channel A and a positive output signal from channel B, which cancel each other so that no signal appears at terminal 31*b*. Output filter 30*c* receives a negative signal from channel B so that a negative signal appears at terminal 31*c*; no signal appears at terminal 31*d*.

Also of interest is the situation when signals are received on channels A and D simultaneously. In that case, the positive output signal provided by channel A is cancelled by the negative output signal provided by channel D so that no signal appears at output terminal 31*a*. A negative signal appears at terminal 31*b*; no signal appears at terminal 31*c*; and a positive signal appears on terminal 31*d*.

From the foregoing examples, it can readily be seen that a considerable variety of output signal conditions may be obtained from a circuit having only four channels, because each channel operates in conjunction with two other channels. The polarities of the output signals may be reversed, of course, by reversing the polarities of the diodes 27 and 28. The various output signal conditions for a circuit connected as in FIG. 3 are set forth in the following table:

| Command signal input to channel | Output Signal presence and polarity at terminals | | | |
|---|---|---|---|---|
| | 31a | 31b | 31c | 31d |
| A | + | − | 0 | 0 |
| B | 0 | + | − | 0 |
| C | 0 | 0 | + | − |
| D | − | 0 | 0 | + |
| A+B | + | 0 | − | 0 |
| A+C | + | − | + | − |
| A+D | 0 | − | 0 | + |
| B+C | 0 | + | 0 | − |
| B+D | − | + | − | + |
| C+D | − | 0 | + | 0 |
| A+B+C | + | 0 | 0 | − |
| B+C+D | − | + | 0 | 0 |
| C+D+A | 0 | − | + | 0 |
| D+A+B | 0 | 0 | − | + |
| A+B+C+D | 0 | 0 | 0 | 0 |

As can be seen from the table, if the actuatable means such as keyers that are connected to the output terminals 31 are sensitive to the polarities of the output signals as well as their presence or absence, many possible control codes are provided. Such a polarity sensitive keyer might comprise a pair of direct current amplifiers biased to cutoff, one of which will operate only on receipt of a positive signal and the other of which will operate only on receipt of a negative signal. Relays may be connected in the output circuits of the amplifiers. If, however, the actuatable means respond only to signals of one polarity (such as would be the case with a Schmitt trigger circuit, for example), then the number of possible combinations must be reduced to eliminate ambiguities. For example, if the actuatable means respond only to positive signals, they would be actuated in the same manner by a single signal appearing on channel A, or by signals appearing simultaneously on channels A and B, or by signals appearing simultaneously on channels A, B and C. Therefore, only one of these combinations can be utilized. That the same condition holds true for other combinations will be readily recognized from an inspection of the table.

Figure 5:
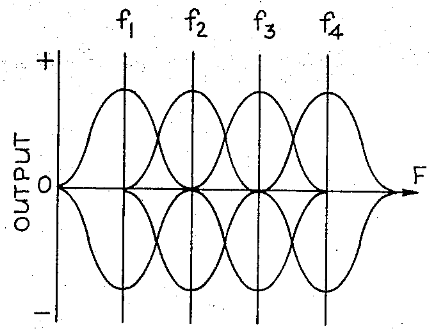
FIG. 5 shows a set of characteristic curves similar to those of FIG. 4.

It is pointed out that the frequencies of the control signals do not need to be spaced apart as widely as is indicated by the composite characteristic of FIG. 4. They may be much more closely spaced and provide a composite characteristic for the rectifier means 20, such as is shown in idealized form in FIG. 5. In fact, it is possible to space the frequencies even closer together than is indicated in FIG. 5, whereby a command signal appearing in one channel will also produce small outputs from adjacent channels. In this case, however, it is necessary that the actuatable means connected to receive the output signals be unresponsive to output signals of less than predetermined amplitudes.

Figure 6:
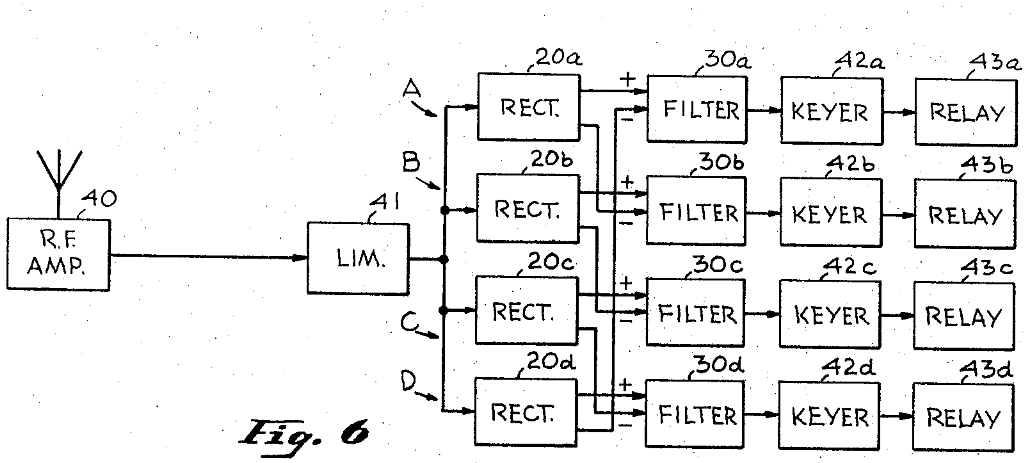
FIG. 6 is a block diagram of a system embodying the present invention for receiving signals having up to four different carrier frequencies.

FIG. 6 illustrates, in block diagram form, a system of the invention, which is adapted to receive four conditional command signals having different carrier frequencies. As previously pointed out, it is understood that the system of the invention is not limited to receiving any particular number of different signals, but may easily be adapted to be responsive to any desired number. As shown in the figure, the incoming command signals are received and amplified by a radio frequency (R.F.) amplifier 40 and amplitude-limited by a limiter 41. The amplifier 40 and the limiter 41 are of conventional types and perform essentially the same functions as the amplifier 11 and limiter 12 shown in the prior art system of FIG. 1.

The amplitude-limited R.F. signals provided from the limiter 41 are supplied to a plurality of frequency sensitive channels A, B, C and D, such as described with reference to FIG. 3. Each of the channels A, B, C and D comprises rectifier means 20, output means such as low-pass filters 30, actuatable means such as keyers 42, and control means such as relays 43. Preferably, in order to obtain one of the important advantages of the invention, the actuatable means and control means are sensitive to the polarities of signals received from the filters 30, as previously described.

Each of the channels A, B, C and D is frequency sensitive and is responsive to a different one of the plurality of input command signals. The rectifier means 20 of each channel functions to provide both positive and negative direct current output signals in response to command signals having the frequency to which the particular channel is responsive, and the channels are interconnected in pairs, as described with reference to FIG. 3, to provide the operating characteristics described in connection with FIG. 4. If amplitude-limited noise signals are present across the frequency spectrum and are received by all four channels, the positive and negative output signals supplied to each low-pass filter 30 substantially cancel each other to provide zero output to the keyers 42. Of course, the various control combinations of positive and negative signals previously described are provided to the keyers 42.

Figure 7:
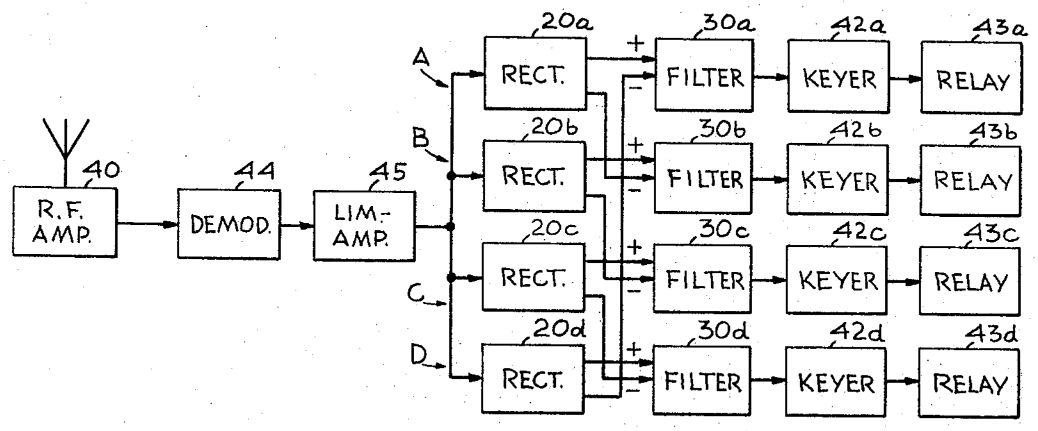
FIG. 7 is a block diagram of an embodiment of the invention for receiving signals having up to four different modulation frequencies.

FIG. 7 illustrates, in block diagram form, an embodiment of the system of the invention which is adapted to receive up to four tone-modulated command signals. In such a system, the conditional command signals are generally all transmitted with the same carrier frequency which is amplitude modulated or frequency modulated at various frequencies to denote the various commands. This type of system includes a radio frequency amplifier 40 which receives and amplifies the incoming command signals. The amplified signals are then supplied to a demodulator 44, which may be either a detector or a discriminator, as suitable, which provides to a limiter-amplifier 45 signals having the various modulation frequency characteristics. The limiter-amplifier 45 amplifies and amplitude-limits the signals and supplies them to a plurality of frequency sensitive channels A, B, C and D. The channels A, B, C and D are essentially the same as those described with reference to FIGS. 3 and 6 and comprise rectifier means 20, output means such as low-pass filters 30, actuatable means such as keyers 42, and control means such as relays 43.

The operation of the circuit shown in FIG. 7, with the exception of the demodulation performed by the demodulator 44, is very similar to that previously described with reference to FIG. 6. Each of the rectifier means 20 responds to a different one of the demodulated amplitude-limited command signals of different frequencies to provide both positive and negative direct current output signals. The rectifier means are again connected in pairs so that each output filter 30 receives a positive direct current signal from one rectifier means and a negative direct current output signal from another rectifier means to provide noise cancellation. The keyers 42 are responsive to the net output signal appearing at the filters 30 to which they are connected to provide both positive and negative signals for energizing other apparatus such as the relays 43 to which they may be connected.

It can now be seen that the invention provides a multi-channel receiving system that is substantially completely insensitive to electrical noise signals. When applied to a command receiving system, the invention also provides means for obtaining many more control combinations of positive and negative signals than has heretofore been possible.

Although several embodiments of the invention have been described, it is apparent that many changes and modifications may be made therein by one skilled in the art without departing from the true spirit and scope of the invention.

The embodiments of the invention in which an exclusive property or privilege is claimed are defined as follows:

1. A system for responding to a plurality of conditional electrical signals having different predetermined frequency characteristics, the system comprising:
- a plurality of signal detection means each responsive to a different frequency signal of said plurality of signals for providing an output signal,
- a plurality of rectifier means each providing both positive and negative direct current output signals in response to a signal applied thereto,
- means applying each of said signal detection means output signals to a different one of said rectifier means,
- output means for each said rectifier means,
- means for supplying output signals of one polarity from each said rectifier means to its corresponding output means,
- means for supplying the output signals of the other polarity from each rectifier means to the output means of another rectifier means, whereby each output means receives positive output signals from one rectifier means and negative output signals from another rectifier means, and
- actuatable means connected to each said output means and responsive to signals appearing thereon.

2. A receiving system for responding to a plurality of conditional electrical signals having different predetermined frequency characteristics, the system comprising:
- input means for receiving said plurality of signals and responsive thereto for providing a plurality of corresponding amplitude-limited signals,
- a plurality of signal detection means each responsive to a different frequency signal of said plurality of amplitude-limited signals for providing an output signal,
- a plurality of rectifier means each providing both positive and negative direct current output signals in response to a signal applied thereto,
- means applying each of said signal detection means output signals to a different one of said rectifier means,
- output means for each said rectifier means,
- means for supplying output signals of one polarity from each said rectifier means to its corresponding output means,
- means for supplying the output signals of the other polarity from each rectifier means to the output means of another rectifier means, whereby each output means receives positive output signals from one rectifier means and negative output signals from another rectifier means, and actuatable means connected to each said output means and responsive to signals appearing thereon.

3. A receiving system for responding to a plurality of conditional electrical signals having different predetermined frequency characteristics, the system comprising:

input means for receiving said plurality of signals and responsive thereto for providing a plurality of corresponding amplitude-limited signals, a plurality of signal detection means each responsive to a different frequency signal of said plurality of amplitude-limited signals for providing an output signal, a plurality of rectifier means each providing both positive and negative direct current output signals of substantially equal amplitudes in response to a signal applied thereto, means applying each of said signal detection means output signals to a different one of said rectifier means, output filter means for each said rectifier means, means for supplying output signals of one polarity from each said rectifier means to its corresponding output filter means, means for supplying the output signals of the other polarity from each rectifier means to the output filter means of another rectifier means, whereby each output filter means receives positive output signals from one rectifier means and negative output signals from another rectifier means, and actuatable means connected to each said output filter means and responsive to signals appearing thereon.

4. A receiving system for responding to a plurality of conditional electrical signals having different predetermined frequency characteristics, the system comprising:

input means for receiving said plurality of signals and responsive thereto for providing a plurality of corresponding amplitude-limited signals, a plurality of signal detection means each responsive to a different frequency signal of said plurality of amplitude-limited signals for providing an output signal, a plurality of rectifier means each providing both positive and negative direct current output signals of substantially equal amplitudes in response to a signal applied thereto, means applying each of said signal detection means output signals to a different one of said rectifier means, low-pass output filter means for each said rectifier means, means for supplying output signals of one polarity from each said rectifier means to its corresponding output filter means, all of said rectifier means providing output signals of the same polarity to their corresponding output filter means, means for supplying the output signals of the other polarity from each rectifier means to the output filter means of another rectifier means, whereby each output filter means receives positive output signals from one rectifier means and negative output signals from another rectifier means, and actuatable means connected to each said output filter means and responsive to signals appearing thereon, all of said actuatable means being responsive to signals of both polarities.

5. A receiving system for responding to a plurality of conditional electrical signals having different predetermined frequencies, the system comprising:

input means for receiving said plurality of signals and responsive thereto for providing a plurality of corresponding amplitude-limited signals, a plurality of signal detection means each responsive to a different frequency signal of said plurality of signals for providing an output signal, a plurality of rectifier means each providing both positive and negative direct current output signals of substantially equal amplitudes in response to a signal applied thereto, means applying each of said signal detection means output signals to a different one of said rectifier means, low-pass output filter means for each said rectifier means, means for supplying output signals of one polarity from each said rectifier means to its corresponding output filter means, all of said rectifier means providing output signals of the same polarity to their corresponding output filter means, means for supplying the output signals of the other polarity from each rectifier means to the output filter means of another rectifier means, whereby each output filter means receives positive output signals from one rectifier means and negative output signals from another rectifier means, and actuatable means connected to each said output filter means and responsive to signals appearing thereon, all of said actuatable means being responsive to signals of both polarities.

6. A receiving system for responding to a plurality of conditional electrical signals having different predetermined frequencies, the system comprising:

input means for receiving said plurality of signals and responsive thereto for providing a plurality of corresponding amplitude-limited signals, a plurality of filter means connected to receive said plurality of amplitude-limited signals, each of said filter means operating to pass signals having a different one of said predetermined frequencies, a rectifier circuit for each filter means connected to receive signals passed by that filter means and provide both positive and negative direct current output signals in response thereto, output means for each rectifier circuit, means for supplying output signals of one polarity from each rectifier circuit to its corresponding output means, all of said rectifier circuits providing output signals of the same polarity to their corresponding output means, means for supplying the output signals of the other polarity from each rectifier circuit to the output means of another rectifier circuit, whereby each output means receives positive output signals from one rectifier circuit and negative output signals from another rectifier circuit, and actuatable means connected to each said output means and responsive to signals appearing thereon.

7. A receiving system for responding to a plurality of conditional electrical signals having different predetermined frequencies, the system comprising:

input means for receiving said plurality of signals and responsive thereto for providing a plurality of corresponding amplitude-limited signals, a plurality of filter means connected to receive said plurality of amplitude-limited signals, each of said filter means operating to pass signals having a different one of said predetermined frequencies, a rectifier circuit for each filter means connected to receive signals passed by that filter means and provide both positive and negative direct current output signals of substantially equal amplitudes in response thereto, output filter means for each rectifier circuit, means for supplying output signals of one polarity from each rectifier circuit to its corresponding output filter means, all of said rectifier circuits providing output signals of the same polarity to their corresponding output filter means, means for supplying the output signals of the other polarity from each rectifier circuit to the output filter means of another rectifier circuit, whereby each output means receives positive output signals from one rectifier circuit and negative output signals from another rectifier circuit, and actuatable means connected to reach said output filter means and responsive to signals appearing thereon.

8. A circuit for discriminating between a plurality of conditional input signals having different predetermined frequency characteristics, the circuit comprising:

a plurality of signal detection means each responsive to a different frequency signal of said plurality of input signals for providing an output signal, a plurality of rectifier means each providing both positive and negative direct current output signals in response to a signal applied thereto, means applying each of said signal detection means output signals to a different one of said rectifier means, output means for each said rectifier means, means for supplying output signals of one polarity from each said rectifier means to its corresponding output means, and means for supplying the output signals of the other polarity from each rectifier means to the output means of another rectifier means, whereby each output means receives positive output signals from one rectifier means and negative output signals from another rectifier means.

9. A circuit for discriminating between a plurality of conditional input signals having different predetermined frequency characteristics, the circuit comprising:

a plurality of signal detection means each responsive to a different frequency signal of said plurality of input signals for providing an output signal, a plurality of rectifier means each providing both positive and negative direct current output signals of substantially equal amplitudes in response to a signal applied thereto, means applying each of said signal detection means output signals to a different one of said rectifier means, low-pass output filter means for each of said rectifier means, means for supplying output signals of one polarity from each said rectifier means to its corresponding output filter means, and means for supplying the output signals of the other polarity from each rectifier means to the output filter means of another rectifier means, whereby each output filter means receives positive output signals from one rectifier means and negative output signals from another rectifier means.

10. A circuit for discriminating between a plurality of conditional input signals having different predetermined frequencies, the circuit comprising:

a plurality of signal detection means each responsive to a different frequency signal of said plurality of signals for providing an output signal, a plurality of rectifier means each providing both positive and negative direct current output signals of substantially equal amplitudes in response to a signal applied thereto, means applying each of said signal detection means output signals to a different one of said rectifier means, low-pass output filter means for each said rectifier means, means for supplying output signals of one polarity from each said rectifier means to its corresponding output filter means, all of said rectifier means providing output signals of the same polarity to their corresponding output filter means, and means for supplying the output signals of the other polarity from each rectifier means to the output filter means of another rectifier means, whereby each output filter means receives positive output signals from one rectifier means and negative output signals from another rectifier means.

11. A circuit for descriminating between a plurality of conditional input signals having different predetermined frequencies, the circuit comprising:

a plurality of input filter means connected to receive said plurality of input signals, each of said input filter means operating to pass signals having a different one of said predetermined frequencies, a rectifier circuit for each input filter means connected to receive signals passed by that input filter means and provide both positive and negative direct current output signals in response thereto, output means for each rectifier circuit, means for supplying output signals of one polarity from each rectifier circuit to its corresponding output means, all of said rectifier circuits providing output signals of the same polarity to their corresponding output means, and means for supplying the output signals of the other polarity from each rectifier circuit to the output means of another rectifier circuit, whereby each output means receives positive output signals from one rectifier circuit and negative output signals from another rectifier circuit.

12. A circuit for discriminating between a plurality of conditional input signals having different predetermined frequencies, the circuit comprising:

a plurality of filters connected to receive said plurality of input signals, each of said filters operating to pass signals having a different one of said predetermined frequencies, a rectifier circuit for each filter connected to receive signals passed by that filter and provide both positive and negative direct current output signals of substantially equal amplitudes in response thereto, output filter means for each rectifier circuit, means for supplying output signals of one polarity from each rectifier circuit to its corresponding output filter means, all of said rectifier circuits providing output signals of the same polarity to their corresponding output filter means, and means for supplying the output signals of the other polarity from each rectifier circuit to the output filter means of another rectifier circuit, whereby each output filter means receives positive output signals from one rectifier circuit and negative output signals from another rectifier circuit.

References Cited

UNITED STATES PATENTS

| | | | |
|---|---|---|---|
| 2,145,053 | 1/1939 | Meszar | 179—84 |
| 2,654,002 | 9/1953 | Hooijkamp | 179—84 |
| 3,057,964 | 10/1962 | Power | 179—84 |
| 3,076,059 | 1/1963 | Meacham et al. | 179—84 |
| 3,128,349 | 4/1964 | Boesch et al. | 179—84 |
| 3,131,264 | 4/1964 | Chittleburgh | 179—84 |

NEIL C. READ, *Primary Examiner.*

H. I. PITTS, *Assistant Examiner.*